United States Patent
Hibner et al.

[11] Patent Number: 5,992,772
[45] Date of Patent: Nov. 30, 1999

[54] APPARATUS FOR DISPENSING LUBRICATING POWDER

[75] Inventors: Paul Frederick Hibner, Howell; Robert Charles Bennett, Fowlerville; James Charles Costello, III, Howell, all of Mich.

[73] Assignee: Chem-Trend Incorporated, Howell, Mich.

[21] Appl. No.: 08/882,624

[22] Filed: Jun. 25, 1997

Related U.S. Application Data

[60] Provisional application No. 60/022,786, Jul. 29, 1996.

[51] Int. Cl.⁶ .............................. B05B 5/025; B05B 7/14
[52] U.S. Cl. ............................................ 239/704; 406/142
[58] Field of Search .................... 239/690, 704, 239/708, 318; 406/142

[56] References Cited

U.S. PATENT DOCUMENTS

| | | | |
|---|---|---|---|
| 1,164,286 | 12/1915 | Josephs, Jr. . | |
| 2,924,489 | 2/1960 | Beckmann | 302/53 |
| 3,187,401 | 6/1965 | O'Donnell et al. | 25/103 |
| 3,412,898 | 11/1968 | Marynowski | 222/1 |
| 3,650,436 | 3/1972 | Barber | 222/70 |
| 3,913,795 | 10/1975 | Coucher et al. | 222/194 |
| 3,995,979 | 12/1976 | Fedrigo | 425/78 |
| 4,022,512 | 5/1977 | Autelli | 302/26 |
| 4,109,027 | 8/1978 | Crose | 427/28 |
| 4,185,783 | 1/1980 | Lacchia | 239/704 |
| 4,715,535 | 12/1987 | Mulder | 239/1 |
| 4,775,267 | 10/1988 | Yamamoto | 406/50 |
| 4,942,998 | 7/1990 | Horvath et al. | 228/102 |
| 5,098,229 | 3/1992 | Meier et al. | 406/93 |
| 5,395,046 | 3/1995 | Knobbe et al. | 239/3 |
| 5,400,921 | 3/1995 | Smith, Jr. et al. | 222/1 |
| 5,620,138 | 4/1997 | Crum | 239/3 |
| 5,682,591 | 10/1997 | Inculet et al. . | |

FOREIGN PATENT DOCUMENTS 698 435 A1  2/1996  European Pat. Off. .

OTHER PUBLICATIONS

Capus, "Replacing internal with external lubricants," PM Technology Trends, MPR, p. 72 (Jul./Aug., 1995).

International Search Report, International Application No. PCT/US97/11139, International Filing Date Jun . 26, 1997.

*Primary Examiner*—Lesley D. Morris
*Attorney, Agent, or Firm*—McAndrews, Held & Malloy Ltd.

[57] ABSTRACT

A powdered lubricant applicator is provided which utilizes a venturi nozzle to draw powder from a fluidized hopper. The amount of powder delivered from the hopper is controlled by the air flow rate through the nozzle and by the length of time that the air flows through the nozzle. As air passes through the nozzle, powdered lubricant is drawn from the fluidized hopper and passed with the air along a delivery tube. As the fluidized powdered lubricant passes along the delivery tube, additional "atomizing" air is introduced into the delivery tube to assist powder delivery to the destination mechanism to be lubricated. In addition, fluidizing air is added to the delivery tube. The air used to assist the powder delivery (i.e., the atomizing air) and the air used to fluidize the powder (i.e., the fluidizing air) impact the powder delivery. Three pressure regulators are used to independently control the flow air, the atomizing air and the fluidizing air. The powdered lubricant applicator pneumatically delivers the powdered lubricant from the delivery tube to a gun which imparts a static charge to the particles within the powdered lubricant. The powdered lubricant continues to flow through the gun to a discharge line and is delivered to the destination, such as the walls of a powdered metal compaction press machine. The static charge imparted by the electrostatic gun facilitates attraction of the powdered particles to the surface of the die walls. The powdered lubricant applicator controls the pressure regulators and electrostatic gun to ensure that a desired amount of powdered lubricant is consistently delivered to the powdered metal compaction press machinery.

15 Claims, 3 Drawing Sheets

APPARATUS FOR DISPENSING LUBRICATING POWDER

CROSS-REFERENCE TO RELATED APPLICATIONS

This application claims the benefit of U.S. Provisional Application No. 60/022,736, filed Jul. 29, 1996.

STATEMENT REGARDING FEDERALLY SPONSORED RESEARCH OR DEVELOPMENT

Not applicable.

BACKGROUND OF THE INVENTION

The present invention generally relates to the field of lubricant applicators and more specifically to a lubricant applicator which utilizes a venturi nozzle to draw powder from a fluidized hopper.

Since the beginning of powder metallurgy, lubricants have been added to metal powders to facilitate the removal of green powdered metal parts from the pressing dies. These lubricants must be subsequently removed from the parts during the sintering process. Numerous problems can result from using internal lubricants in powder metallurgy. These include coating of the sintering furnace interiors and incomplete lubricant removal. The former leads to a less effective sintering process and increased maintenance, while the latter leads to blistering and porosity. Other internal lubricant related problems include reduced green strength, reduced tensile strength of sintered parts, lower part density, reduced particle-to-particle compaction during pressing, and reduced particle-to-particle cementation during sintering.

Replacing internal lubricants with external lubricants will reduce and/or eliminate a number of the problems associated with internal lubricants in powder metallurgy. External lubricants applied to the surface of the pressing dies and transferred to the green powdered metal parts can be more readily removed from the parts than internal lubricants. Lower viscosity liquid lubricants capable of releasing the parts from the dies may penetrate the surface of the parts more than higher viscosity liquid lubricants making their removal from the parts more difficult than high viscosity liquids. A solid external lubricant applied to the die surface is not likely to penetrate the green powdered metal parts' surface at all and be more readily removed from the parts.

External solid lubricants capable of releasing the green powdered metal parts from pressing dies exist, as do applicators for applying the powdered lubricants. One such applicator proposed by the assignee of the present application is the applicator disclosed in U.S. Pat. No. 5,400,921. The '921 patent discloses a particulate material delivery apparatus comprising a measuring device for separating a predetermined quantity of particulate material from a particulate material supply. A first valve is provided responsive to a single input signal to regulate a control fluid and a delivery fluid. An actuator shifts a measuring device between measuring and delivery positions in response to a pressure signal from the first valve. A control apparatus dispenses a pressurized delivery fluid for a variable, predetermined interval of time in response to a pressure signal from the first valve. A method for delivery of measured charges of particulate material is also provided. The method of the '921 patent comprises the steps of discharging one charge of the material to a first location, measuring a second charge of the material and delivering the first charge to a remote location while measuring the second charge. However, a need remains for an improved applicator.

BRIEF SUMMARY OF THE INVENTION

It is an advantage of the present invention to provide a powdered lubricant applicator capable of dispensing powdered lubricants into remote recesses, deep corners and complex configurations.

It is a further advantage of the present invention to provide a powdered lubricant applicator which operates in conjunction with an electrostatic gun to facilitate retention of the powdered lubricant upon the surfaces to be lubricated.

It is yet a further advantage of the present invention to eliminate the need for internal lubricants within powder metallurgy by substituting external dry powdered lubricants.

These and other advantages of the present invention are provided by a powdered lubricant applicator which utilizes a venturi nozzle to draw powder from a fluidized hopper. The amount of powder delivered from the hopper is controlled by the air flow rate through the venturi nozzle and by the length of time that the air flows through the nozzle. As air passes through the venturi nozzle, powdered lubricant is drawn from the fluidized hopper and passed with the air along a delivery tube. As the fluidized powdered lubricant passes along the delivery tube, additional "atomizing" air is introduced into the delivery tube to assist powder delivery to the destination mechanism to be lubricated. In addition, fluidizing air is added to the delivery tube. The air used to assist the powder delivery (i.e., the atomizing air) and the air used to fluidize the powder (i.e., the fluidizing air) impact the powder delivery. Three pressure regulators are used to independently control the flow air, the atomizing air and the fluidizing air. The powdered lubricant applicator pneumatically delivers the powdered lubricant from the delivery tube to an electrostatic gun which imparts a static charge to the particles within the powdered lubricant. The powdered lubricant continues to flow through the electrostatic gun to a discharge line and is delivered to the destination, such as the walls of a powdered metal compaction press machine. The static charge imparted by the electrostatic gun facilitates attraction of the powdered particles to the surface of the die walls. The powdered lubricant applicator controls the pressure regulators and electrostatic gun to ensure that a desired amount of powdered lubricant is consistently delivered to the powdered metal compaction press machine.

DETAILED DESCRIPTION OF THE INVENTION

Figure 1:
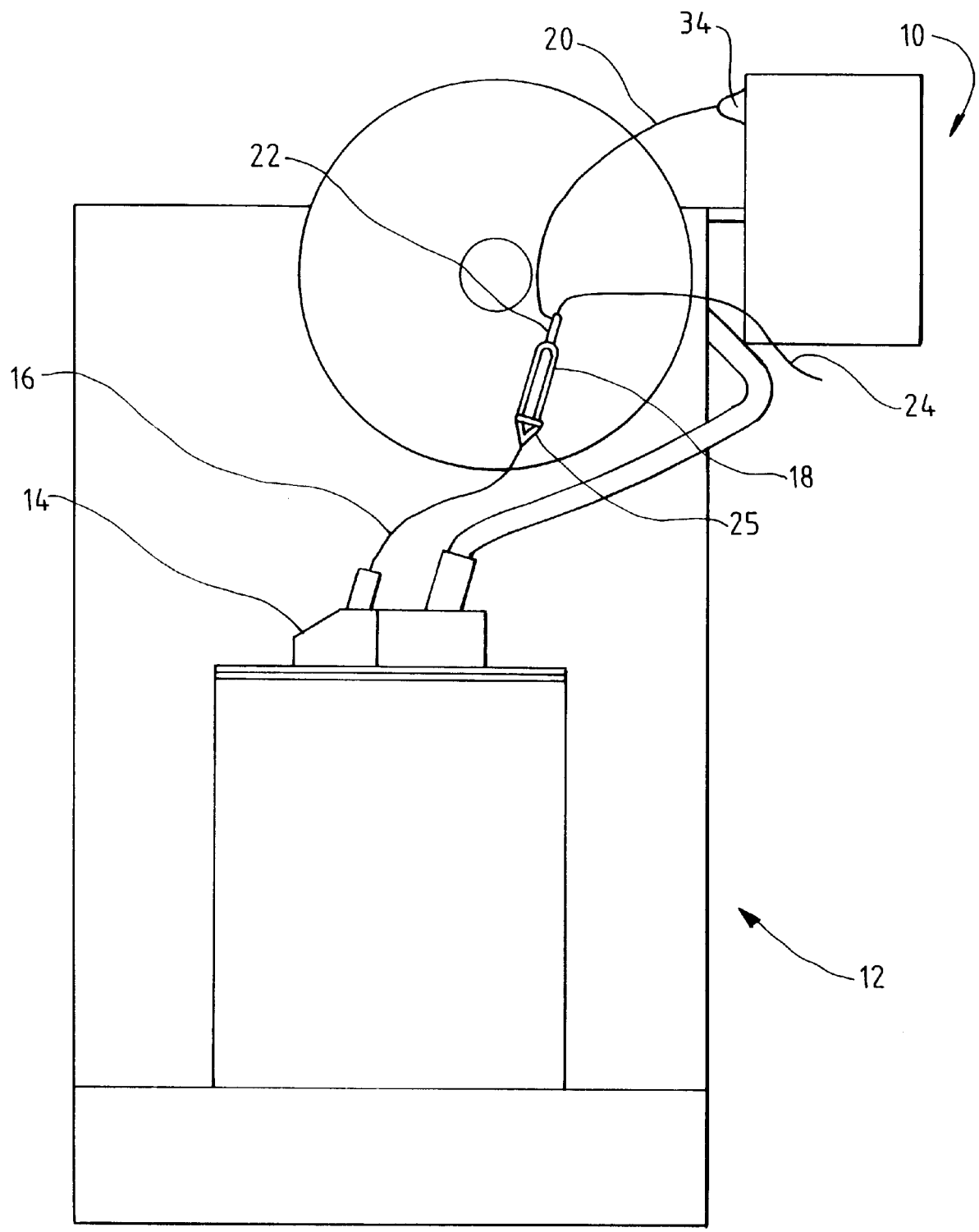
FIG. 1 generally illustrates a side view of a preferred embodiment of the present invention.

FIG. 1 generally illustrates an applicator 10 mounted to a compaction press 12. The compaction press 12 includes a feed shoe 14 through which fluidized powder is delivered as a lubricant to the compaction press 12. The feed shoe 14 receives fluidized powder via a powder supply conduit 16 from a tribostatic gun 18. The tribostatic gun 18 receives fluidized powder from the applicator 10 via a conduit 20. An inlet port 22 combines incoming fluidized powder along conduit 20 and atomizing air along conduit 24. The tribostatic gun 18 charges fluidized lubricant particles as the particles pass therethrough to conduit 16. The tribostatic gun 18 utilizes friction between the particles and the gun as well as friction between particles themselves to build an electrical charge onto the particles. The charged particles exit at outlet 25. The gun 18 imparts a static charge to the powder particles, so that the interior surfaces of the compaction press 12 strongly attract the particles.

As explained below, the applicator 10 utilizes a venturi nozzle to draw powder from a fluidized hopper 30. The amount of powder delivered from the hopper 30 is controlled by the air flow rate through the venturi nozzle (e.g., flow air) and the length of time during which the flow air passes through the nozzle. Thereafter, additional air (e.g., atomizing air and fluidizing air) is used to assist and impact powder delivery to the gun 18.

Figure 2:
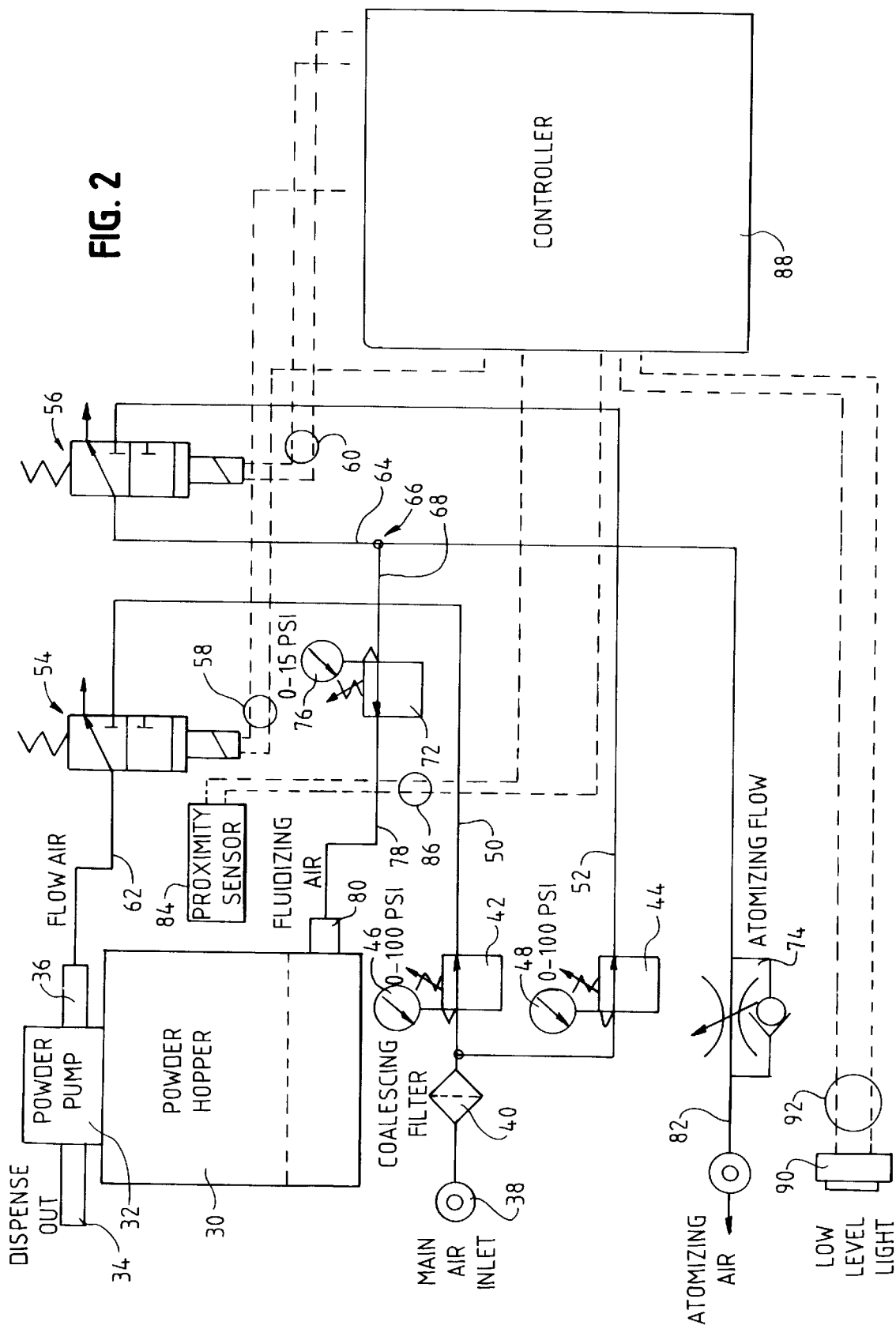
FIG. 2 generally illustrates a fluid control block diagram utilized by the preferred embodiment of the present invention.

Turning to FIG. 2, a block diagram of the air and particulate or powder flow paths is illustrated in more detail. In FIG. 2, the powder hopper 30 is provided with a powder pump 32 mounted thereto. The powder hopper 30 contains the supply of lubricating powder delivered by the applicator 10 to the compaction press 12. The powder hopper 30 is illustrated and described in more detail in connection with FIG. 3. The powder pump 32 includes a discharge port 34 for delivering fluidized lubricant powder to the conduit 20. The powder pump 32 receives flow air at inlet port 36. The powder pump 32 is illustrated in more detail in FIG. 4.

A main air inlet port 38 is provided at which pressurized air is supplied from a remote source (not illustrated). The main air supply is delivered from inlet port 38 to a coalescing filter 40 and thereafter to pressure regulators 42 and 44. Optionally, pressure gauges 46 and 48 may be provided to indicate the pressure at regulators 42 and 44, respectively. Regulators 42 and 44 output pressurized air at a predefined pressure level along conduits 50 and 52 to air valves 54 and 56, respectively. The air valves 54 and 56 regulate air flow based on command signals received from control lines 58 and 60. Air valve 54 selectively outputs pressurized air along flow air conduit 62 and delivers same to the powder pump 32 (explained in more detail below). Air valve 56 selectively outputs pressurized air along line 64. Air flow along line 64 is divided at node 66 and delivered via lines 68 and 70 to pressure regulators 72 and 74. Optionally, a pressure gauge 76 may be provided at pressure regulator 72 to indicate the pressure at which air passes through the regulator 72. The pressure regulator 72 outputs fluidizing air along conduit 78. The fluidizing air is supplied to a port 80 located proximate the lower end of the powder hopper 30. The regulator 74 outputs atomizing air, along conduit 82, which is ultimately delivered to the gun 18 via conduit 24 (see FIG. 1).

A proximity sensor 84 is located adjacent the side of the powder hopper 30 and at the lower end thereof to detect the level of lubricant powder within the hopper 30. The proximity sensor 84 delivers a sensory signal along sensor lines 86 to a controller 88. Based upon the signal on sensor lines 86, the controller 88 turns a low level light 90 on and off via power lines 92.

Figure 3:
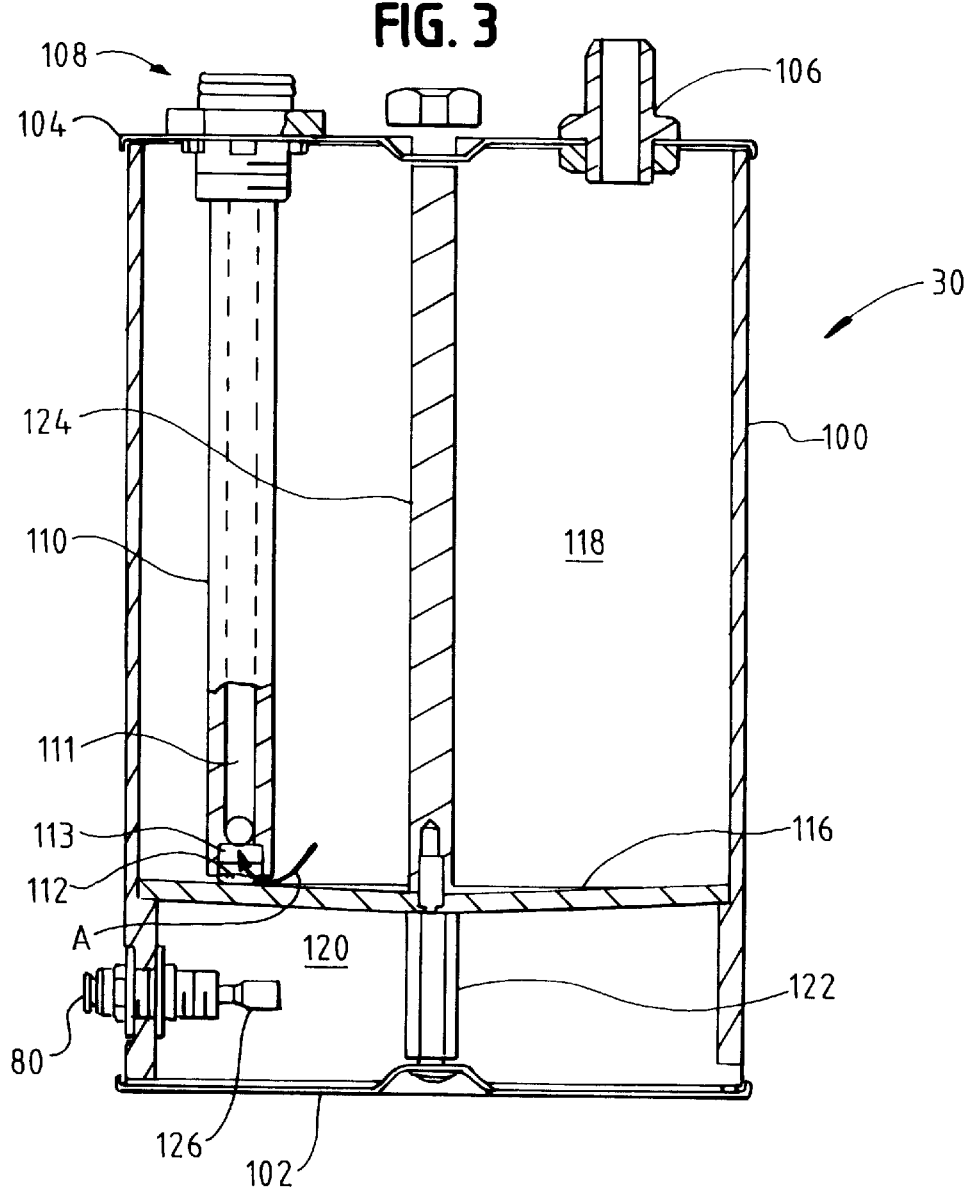
FIG. 3 generally illustrates a side sectional view of a powder hopper utilized in the preferred embodiment of the present invention.

FIG. 3 illustrates a cross-sectional view of the powder hopper 30. The hopper 30 includes a housing 100 with a closed lower end 102 and a closed upper end 104. The upper end 104 includes a vent outlet 106 and a powder outlet 108. The powder outlet 108 communicates with a fluidizing pick-up tube 110 which extends downward into the hopper 30 proximate a bottom thereof. The pick-up tube 110 has a hollow interior channel 11 and a capped lower end 112 having an orifice 113 therethrough. The tube 110 and capped end 112 define the channel 111 from a lower end of the hopper 30 to the powder outlet port 108. Powder passes through the orifice 113 in the cap 112 as indicated by arrow A.

The housing 100 includes an interior surface having a circular shoulder 114 formed thereabout proximate the lower end 102. The shoulder 114 supportably receives a circular fluidizing plate 116 which spans the interior of the hopper 30 to define a powder chamber 118 and a fluidizing air chamber 120. A spacer 122 extends from the lower end 102 to the plate 116. A support rod 124 extends from the upper end 104 to the plate 116. The spacer 122 and support rod 124 cooperate to support opposite ends 102 and 104 of the hopper 30. The fluidizing plate 116 includes openings therethrough, such as thin slits or the like, to pass fluidizing air from the air chamber 120 to the powder chamber 118.

The housing 100 securely receives the fluidizing air inlet port 80 (as shown in FIG. 2) to accept fluidizing air from conduit 78. The inlet port 80 may include a restrictor 126 on an interior end to restrict the flow rate of fluidizing air.

As fluidizing air is injected through port 80, the fluidizing air creates a high pressure zone within the air chamber 120 relative to the powder chamber 118. Air flows through the slits in the plate 116 into the powder chamber 118, thereby creating turbulence proximate the bottom of the powder chamber 118 where the powder collects. This turbulent air flow stirs the powder to facilitate fluidization of the powder by ensuring that the inlet orifice 113 to the pick-up tube 110 is continuously surrounded by powder.

Figure 4:
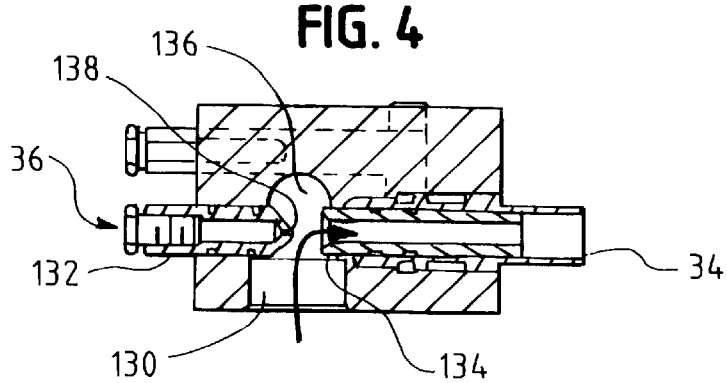
FIG. 4 illustrates a side sectional view of a powder pump mounted to the powder hopper according to the preferred embodiment of the present invention.

FIG. 4 illustrates a side-sectional view of the powder pump 32 mounted to the top of the powder hopper 30 as shown in FIG. 2. The powder pump 32 includes a powder inlet port 130 which communicates with the outlet port 108 of the hopper 30. The powder pump 32 also includes a venturi nozzle 132 having an inlet end 36 (as illustrated in FIG. 2) for admitting flow air from conduit 62. The venturi nozzle 132 includes an outlet 138 arranged within a draw chamber 136. A venturi throat 134 directs flow air from the outlet 138 to the discharge port 34 (see FIG. 2). As the venturi nozzle 132 discharges flow air, a vacuum is generated in the chamber 136, thereby drawing air and powder via the inlet port 130 from the hollow pick-up tube 110. In this manner, powder is sucked into and carried upward through the pick-up tube 110 to the powder outlet 108. The powder is entrained within the flow air stream and carried outward through the venturi throat 134 and discharge port 34.

Optionally, as illustrated in FIG. 3, fluidizing air may be delivered through fluidizing air inlet port 80 into chamber 120 in order to disturb powder collected upon the bottom of the powder chamber 118. Disturbing powder in this manner facilitates flow of powder through the pick-up tube 110 and the powder pump 32. The powder flow rate may be adjusted by varying the flow air rate through venturi nozzle 132 and the fluidizing air rate through fluidizing air inlet port 80. These flow rates may be manually or automatically adjusted.

As fluidized lubricant powder passes from the discharge port 34, it is delivered to the conduit 20 (see FIG. 1). The powder is carried to the inlet port 22 of the gun 18, whereat additional diffusion or atomizing air may be introduced via conduit 24. By varying the flow rate of air through conduit 24, the overall powder flow rate is adjusted. The flow of air through conduit 24 may be manually or automatically adjusted.

According to the foregoing manner, powder is fluidized in the hopper 30 by moving small amounts of air through the plate 116 and the powder. This small amount of air facilitates free powder flow without bridging of the powder particles. The powder is delivered on demand from the fluidizer to the tribostatic gun 18 based on control of valves 54 and 56 by controller 88. As powder flows through the gun 18, the powder becomes electrically charged and ultimately becomes attracted to the interior surface of the device to be lubricated. The foregoing system enables interior surfaces of an apparatus to be lubricated with powders. Superior lubrication is achieved even within deep corners, recesses and complex internal configurations which are inaccessible by non-electrostatic methods.

While FIG. 1 illustrates application of the lubricant powder to a compaction press, the present invention is not so limited. Instead, the present invention may be useful with any system capable of accepting lubricant powder.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

What is claimed is:

1. An apparatus for dispensing lubricating powder into a powdered metal compaction press, comprising:

a powder hopper for storing a supply of lubricating powder;

a pneumatic pump communicating with said hopper, said pump having a flow air inlet port for receiving a stream of flow air which draws lubricating powder from said hopper into said pump, said pump having an outlet port for discharging fluidized lubricating powder entrained in said stream of flow air;

an electrostatic gun communicating with said outlet port of said pump for receiving said fluidized lubricating powder entrained in said stream of flow air, said gun imparting a static charge to said fluidized lubricating powder as said fluidized lubricating powder passes through said gun to a discharge port; and a supply conduit communicating with said discharge port of said electrostatic gun for transporting said fluidized lubricating powder as statically charged fluidized lubricating powder entrained in said stream of flow air from said discharge port to the powdered metal compaction press.

2. An apparatus according to claim 1, further comprising:

a flow air conduit extending between said outlet port of said pump and said gun; and an atomizing air conduit for supplying atomizing air to said stream of flow air in said flow air conduit.

3. An apparatus according to claim 1 further comprising a pressure regulator for regulating a flow rate of said flow air entering said pneumatic pump.

4. An apparatus according to claim 2, further comprising flow and atomizing pressure regulators for regulating rates of said flow air to said pneumatic pump and said atomizing air through said atomizing conduit.

5. An apparatus according to claim 2, further comprising supply valves for turning on and off a supply of said flow air and said atomizing air.

6. An apparatus according to claim 1, wherein said powder hopper further includes:

a fluidizing plate therein for defining a fluidizing chamber and a powder storage chamber; and an inlet port into said fluidizing chamber for receiving fluidizing air to circulate powder within said powder storage chamber.

7. An apparatus according to claim 6, further comprising:

a pressure regulator for regulating a flow of said fluidizing air.

8. An apparatus according to claim 1, further comprising:

a proximity sensor located adjacent a bottom end of said powder hopper to sense a low level of powder within said hopper; and a low level indicator for indicating when said proximity sensor detects that a level of powder in said powder hopper is below a predetermined threshold.

9. An apparatus according to claim 1, further comprising:

a controller for regulating a flow rate of said flow air.

10. An apparatus according to claim 2, further comprising:

a controller for regulating a flow rate of said flow air and said atomizing air.

11. An apparatus according to claim 6, further comprising a controller for controlling a flow rate of said fluidizing air.

12. An apparatus according to claim 1, wherein said powder hopper further comprises a pick-up tube extending downward through an interior of said hopper, said pick-up tube drawing powder from a bottom of said hopper.

13. An apparatus according to claim 1, wherein said pneumatic pump comprises a venturi nozzle and throat assembly for passing said stream of flow air therethrough and entraining powder therein.

14. An apparatus according to claim 1, wherein said pneumatic pump is located on an upper end of said powder hopper, said pneumatic pump drawing powder from a bottom of said hopper.

15. An apparatus according to claim 1, wherein said powder hopper further comprises:

a fluidizing plate extending across an interior of said hopper to define fluidizing and powder storage chambers; and a fluidizing air inlet port adapted to receive fluidizing air, said fluidizing air inlet port including a restrictor for directing fluidizing air into said fluidizing chamber and upward through said fluidizing plate to stir powder within said powder storage chamber.

* * * * *